United States Patent [19] [11] 4,365,454
Davis [45] Dec. 28, 1982

[54] CONSTRUCTION SYSTEM

[75] Inventor: John M. Davis, Berlin, Mass.

[73] Assignee: Cubit Corporation, Stowe, Mass.

[21] Appl. No.: 244,331

[22] Filed: Mar. 17, 1981

Related U.S. Application Data

[62] Division of Ser. No. 13,086, Feb. 21, 1979.

[51] Int. Cl.³ .............................................. E04C 1/10
[52] U.S. Cl. ...................................... 52/586; 52/631; 46/31
[58] Field of Search ................. 52/631, 585, 586, 582; 46/30, 31, 21

[56] References Cited

U.S. PATENT DOCUMENTS

| | | | |
|---|---|---|---|
| 1,557,165 | 10/1925 | Hooper . | |
| 2,466,805 | 4/1949 | Griffin | 35/1 |
| 2,708,329 | 5/1955 | McKee | 46/31 |
| 2,843,971 | 7/1958 | Gardellin | 46/26 |
| 3,303,604 | 2/1967 | Mote | 46/25 |
| 3,859,769 | 1/1975 | Watkins | 52/588 |
| 4,257,207 | 3/1981 | Davis | 52/631 X |

Primary Examiner—Price C. Faw, Jr.
Assistant Examiner—Carl D. Friedman
Attorney, Agent, or Firm—Blodgett & Blodgett

[57] ABSTRACT

Construction system consisting of a flat main body having recesses at its edges and a centrally-hinged connecting member having opposed parts that fit in the recesses.

6 Claims, 20 Drawing Figures

CONSTRUCTION SYSTEM

This is a division of application Ser. No. 13,086 filed Feb. 21, 1979.

BACKGROUND OF THE INVENTION

There are many situations in modern society where it is desirable to have a light-weight construction system for structures which can be disassembled and converted to a compact condition for transportation and storage. For instance, in connection with advertising displays for industry fairs, the persons responsible for arranging and setting up a display may be required to do so in geographical locations which are far apart; the locations may be quite diverse in other respects. Since the display must be carried by airplane or carried manually some distance, it is desirable that the construction system incorporated in the display be light in weight and compact. Furthermore, it must be capable of being re-assembled in various display areas in different ways to compensate for the variations in the display area available at the various fairs. In some locations, the display area may consist of a booth or recess, while in other cases the display may be free standing, i.e., approachable from all directions so that the nature of the display is to be of a semi-permanent nature as, for instance, in the display of goods in a retail establishment, these attributes of lightness, compactness when disassembled, and versatility in assembly are desirable. Those same qualities which are desirable in the advertising and business world are those which are also desirable in educational kits and toys for children. In the past, structures having the above enumerated characteristics have been expensive, difficult to assemble, easily broken and rendered inoperative, and have not had a pleasing appearance. These and other difficulties with the prior art devices have been obviated in a novel manner by the present invention.

It is, therefore, an outstanding object of the invention to provide a construction system for structures which is light in weight and which can be disassembled to a compact form for storage and transportation.

Another object of the present invention is the provision of a construction system for use in displays or the like in which a variety of structures can be formed from a small number of basic parts.

A further object of the present invention is the provision of a construction system permitting the formation of a strong temporary structure by combining a number of elements selected from two simple basic parts.

It is another object of the instant invention to provide a display structure formed from a number of light-weight elements formed of paper and foamed plastic, the elements being relatively inexpensive so that damage, wear, or discoloration of an element can justify it being discarded and replaced.

A still further object of the invention is the provision of a construction system of great versatility, wherein the elements can be assembled in a variety of ways to suit the function, space available, and the like.

It is a further object of the invention to provide a construction system which is inexpensive to manufacture, which is simple and rugged in construction, and which is capable of a long life of useful service with a minimum of maintenance.

It is a still further object of the present invention to provide a construction system which can be assembled by persons having little mechanical appitude and without the use of tools.

With these and other objects in view, as will be apparent to those skilled in the art, the invention resides in the combination of parts set forth in the specification and covered by the claims appended hereto.

SUMMARY OF THE INVENTION

In general, the invention consists of a construction system formed from a plurality of main bodies, each of which is made of a light-weight, flexible material having a plurality of sides, each side having a triangular recess, and of a plurality of connecting members, each of which has a hinged line dividing it into two parts, each part being a triangle that fits snugly into one of the said recesses in the main body.

More specifically, each main body and each connecting member is formed from a sheet material consisting of two layers of paper between which is sandwiched a layer of flexible, foamed plastic. The main body is square and consists of two such sheets held in spaced-parallel relationship with a cruciform intermediate member sandwiched between them to define a triangular recess opening on each of the four edges of the main body. Each recess is twice as thick as a connecting member. The connecting member is generally square in shape with beveled corners and the diagonal hinge line is formed by a scoring of the material on each side.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
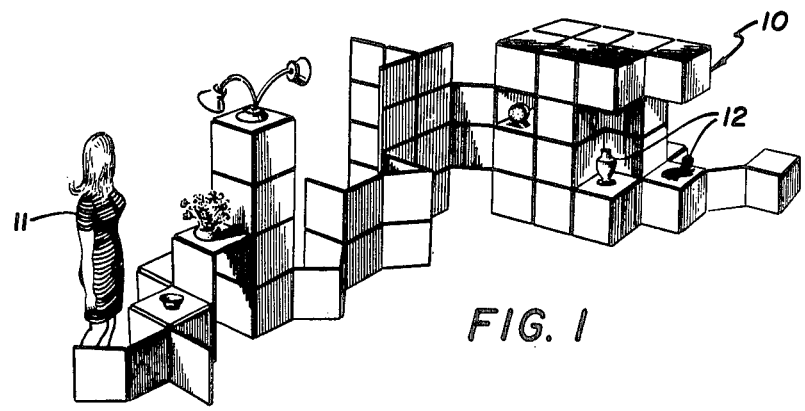
FIG. 1 is a perspective view of a construction system embodying the principles of the present invention.

Referring first to FIG. 1, wherein are best shown the general features of the invention, the construction system, indicated generally by the reference numeral 10, is shown in use in displaying items 12 with a sales person 11 in attendance. The display structure shown is generally pyramidal in shape and accessible from all sides, but it will be understood that the specific form of the structure may take any one of a large number of forms.

Figure 2:
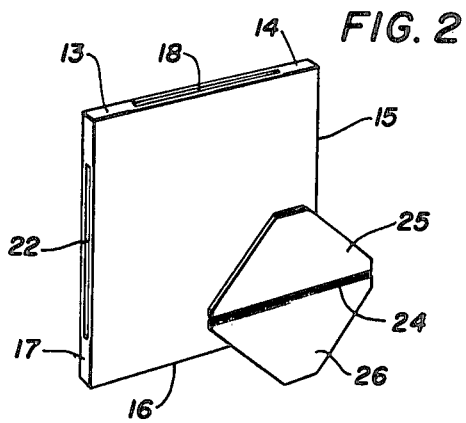
FIG. 2 is a perspective view showing the two basic elements of the system.
Figure 4:
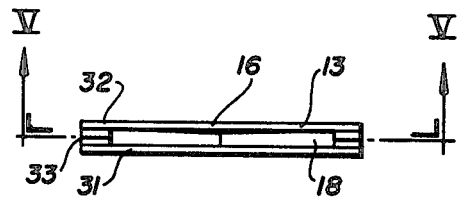
FIG. 4 is an edge view of the main body.
Figure 3:
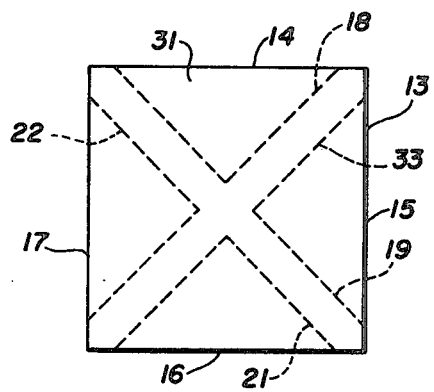
FIG. 3 is a plan view of a main body.
Figure 5:
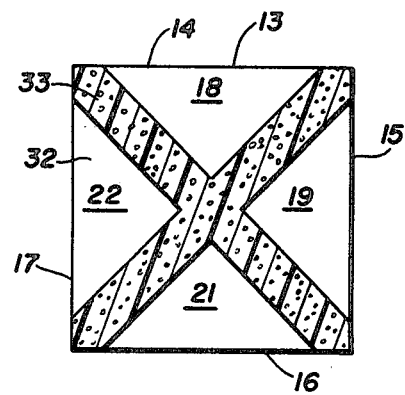
FIG. 5 is a sectional view of the main body taken on the line V—V of FIG. 3.
Figure 6:
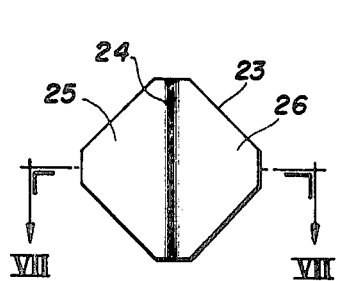
FIG. 6 is a plan view of a connecting member.
Figure 7:
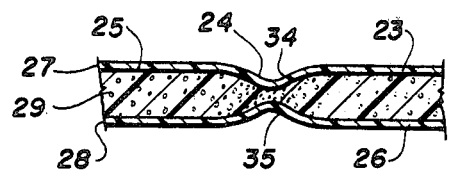
FIG. 7 is a sectional view of the connecting member taken on the line VII—VII of FIG. 6.

FIG. 2 shows in perspective the important elements of the construction system including a main body 13 and a connecting member 23. The main body 13, whose details are best shown in FIGS. 3, 4, and 5, is shown as being plate-like in nature and in the form of a square having four sides 14, 15, 16, and 17. These sides are provided, respectively, with triangular recesses 18, 19, 21, and 22. The connecting member 23, whose details are shown in FIGS. 6 and 7, is also shown as being plate-like in configuration and in the shape of a somewhat smaller square with beveled corners. Extending diagonally from one corner to an opposite corner is a hinge 24 which serves to divide the connecting member into two triangular parts 25 and 26.

In FIGS. 3, 4, and 5 it can be seen that the main body 13 is formed of two-spaced parallel sheets 31 and 32, between which is sandwiched a cruciform intermediate element 33. Each sheet is formed of a thin material formed as two layers of cardboard between which are sandwiched a layer of resilient foamed plastic; this material is available commercially under the name "FOAM COR" manufactured by Monsanto Company. The cruciform intermediate element 33 is made of two such sheets, so that the recesses 18, 19, 21 and 22 are twice as thick as a sheet. Because of the nature of the cruciform intermediate element 33, the recesses are triangular in shape and approximately the same size as each of the parts 25 and 26 of the connecting member 23.

Referring next to FIGS. 6 and 7, which show the details of the connecting member 23, it can be seen that the member is made of the same sheet material as the main body, that is to say, of two layers of cardboard with a layer of resilient foamed plastic sandwiched between them. The hinge 24 is formed by two scores 34 and 35 on opposite sides of the sheet. These scores tend to compress the foamed plastic layer and to provide fairly flexible bending about the hinge line, while increasing the stiffness of the connecting member in the transverse bending direction. It should be noted that the main body 13 is considerably larger than the connecting member 23, so that the recesses on the main body terminate on their respective sides a substantial distance from the corners, but, nevertheless, each recess is large enough to completely envelope one-half (a part 25 or 26) of the connecting member. It might be said that the cruciform intermediate element 33 could be formed by placing together two sheets that are the same size and shape as the outer sheets 31 and 32 and then removing from the center of each side a 45° triangle whose base lies on the side, but terminates a substantial distance from each end of the side.

Figure 19:
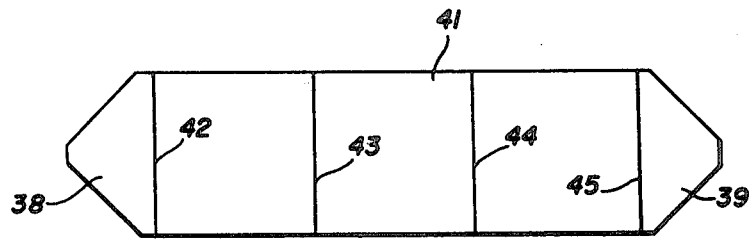
FIG. 19 is a plan view of a support element forming part of the invention.
Figure 20:
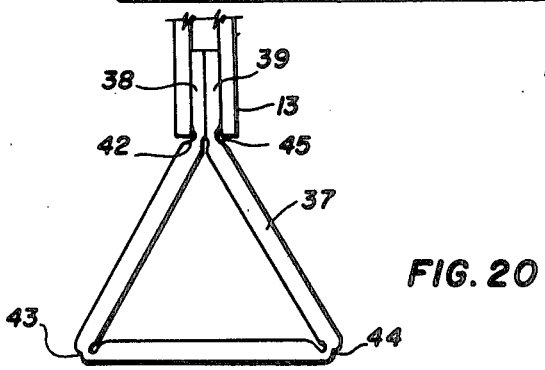
FIG. 20 is an elevational view showing the assembly of the supporting element with a main body.

FIGS. 19 and 20 show a support element 37 which is useful in connection with the construction system. It consists of an elongated sheet element made of the same sheet material as the connecting member 23 which a main rectangular portion having score lines 42, 43, 44, and 45 which define triangles at the ends of the same size as the triangular parts 25 and 26 of the connecting member. The score lines divide the intermediate portion into three square panels.

Figure 8:
FIG. 8 is an edge view of two main bodies connected in the same plane by a connecting member.
Figure 9:
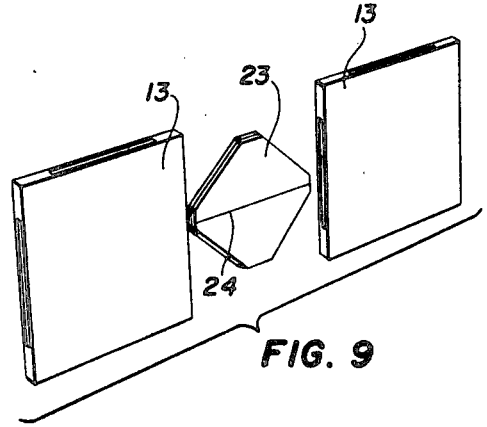
FIG. 9 is an exploded view showing the manner in which the main bodies and the connecting member in FIG. 8 are joined.
Figure 10:
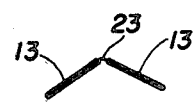
FIG. 10 is an edge view of two main bodies connecting in angular relationship by a connecting member.
Figure 11:
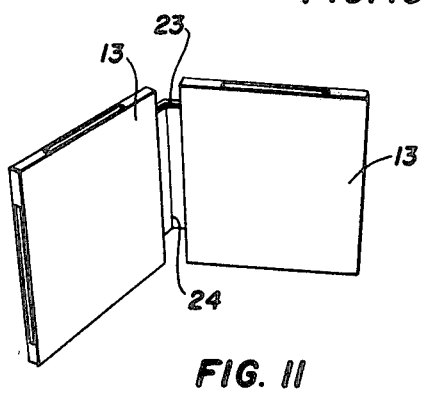
FIG. 11 is a perspective view showing the manner in which the two bodies in FIG. 10 are connected angularly by a connecting member.
Figure 12:
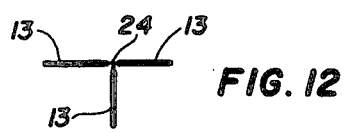
FIG. 12 is an edge view of three main bodies connected to form a T-shaped structure using three connecting members to join them.
Figure 13:
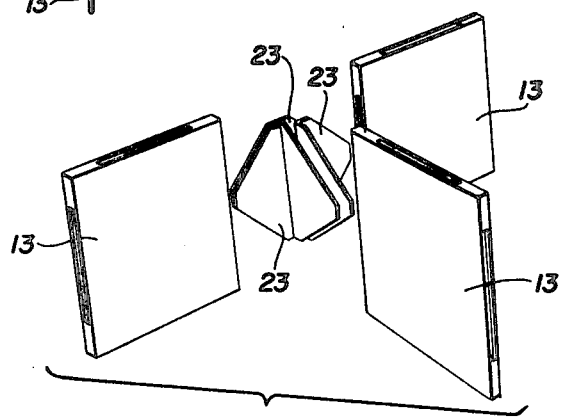
FIG. 13 is an exploded view showing the manner in which the three main bodies in FIG. 12 are joined by the three connecting members.
Figure 14:
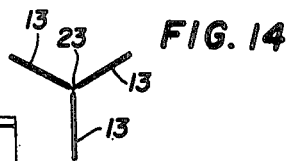
FIG. 14 is an edge view showing the manner in which three main bodies can be joined by connecting members to form a Y-shaped structure.
Figure 15:
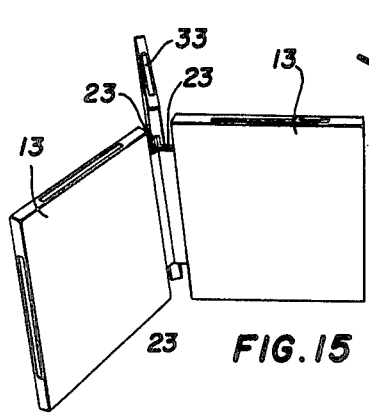
FIG. 15 is a perspective view showing the manner in which the main bodies and connecting members of FIG. 14 are joined.
Figure 16:
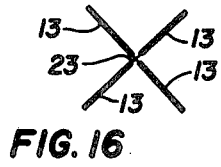
FIG. 16 is an edge view showing the manner in which four main bodies are joined to form a cross-shaped structure.
Figure 17:
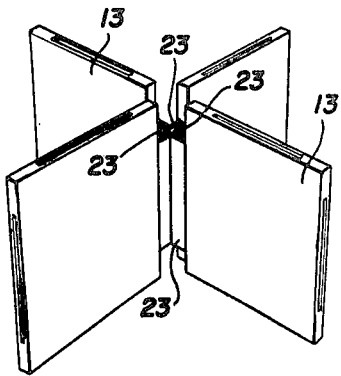
FIG. 17 is a perspective view showing the manner in which the four main bodies in FIG. 16 are joined by four connecting members.
Figure 18:
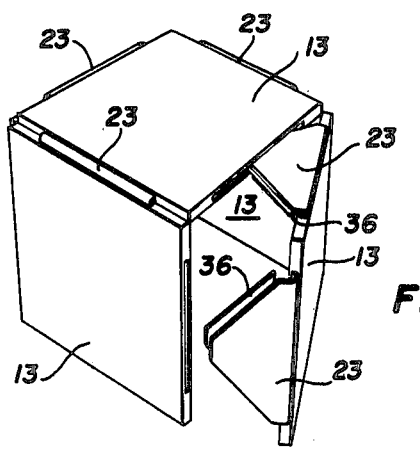
FIG. 18 is a perspective view showing the manner in which five main bodies are joined by connecting members and fiber elements to form an open-sided cube.

The operation and the advantages of the present invention are well illustrated in FIGS. 8–18. In general, the user is provided with a plurality of the main bodies 13 and of the connecting members 23; with these he is able to form a number of desirable supporting structures. In general, two main bodies 13 can be joined in line in the same plane by using two connecting members 13 with their hinge lines lying perpendicular to the sides of the main bodies which are being joined; this arrangement is shown in FIGS. 8 and 9. FIGS. 10 and 11 show the manner in which two main bodies 13 can be joined with their planes at an obtuse angle. In this case, two connecting members 23 are used but their hinge lines lie between and parallel to the adjacent two sides of the main bodies which are being joined. FIGS. 12 and 13 show the manner in which three main bodies are joined, two of them being joined together in the same plane and the third being joined at a right angle to the other two. In this case three connecting members are used. One of them is not bent and has its hinge line lying perpendicular to the sides of the main bodies which are to be joined in the same plane. The other two have their hinge lines extending in the opposite direction, that is to say, parallel to the edges of the main bodies which are being joined, so that two parts 25 and 26 are bent at a right angle. FIGS. 14 and 15 show the joining of three main bodies 13 at 120° to one another, making use of three connecting elements 23. The hinge line in all three connecting elements is parallel to the sides of the main bodies being joined, and each connecting member is bent at an angle of 120° with each triangular half inserted into one of the recesses of the main bodies. FIGS. 16 and 17 show the manner in which four main bodies 13 can be joined at right angles to one another to form a cross-shaped configuration. In this case four connecting members 23 are used, each one having its hinge line arranged vertically and lying between the edges of the main bodies which are to be joined. Each connecting member is bent at a right angle with its triangular parts 25 and 26 inserted into the recesses of immediately adjacent main bodies. FIG. 18 shows the manner in which five main bodies 13 can be joined by eight connecting members to form an open cube, preferably with the open side facing downwardly to provide an upper horizontal supporting surface. Because it is undesirable to bend two connecting members 23 together at a right angle in the same direction, only one connecting member is sued at each joint and the remainder of the recess is provided with a filler element 36 which is formed from the same foamed plastic sheet as the other elements and is in the shape of triangle of the same size and shape as the triangular parts 25 and 26 of the connecting members 23. This filler element 36 serves to hold the single connecting member snugly in each of the recesses.

It can be seen, then, that, by use of the present construction system, it is possible to build a wide variety of supporting and display structures. Because of the light weight of the foamed plastic-cardboard sandwich, it is possible to store and transport large numbers of the elements without difficulty. Since all of the elements are basically flat panels, they store into a small volume of space. Thus, the disassembled elements are not only light in weight, but small in volume, which are the most desirable characteristics for this type of use. Since the material from which the elements are made is relatively inexpensive and because they can be formed and cut on simple equipment, they are not expensive to make. Furthermore, one is justified in discarding any of the elements that become worn, tattered, or dirty. On the other hand, since it is usual to make the sheet material with glazed outer surfaces, they are easy to keep clean by simple washing and wiping techniques. Because (as has been demonstrated) it is possible to join the panels in almost any conceivable array, there is a wide range of uses for the panels that is limited only the the imagination and ingenuity of the user. For a more permanent connection, it is possible to provide fastening pins to lock the connecting elements and the main bodies together. Otherwise, it can be seen that it is not necessary to use tools in assembling the structure, nor is it necessary to hire labor at the point of assembly. The assembly of the construction system of the invention is not hard physical work, nor does it require any particular mechanical ingenuity. It is possible, therefore, to save a considerable amount of money, because it is not necessary to ship by expensive means or to incurr the expense of storing, maintaining, setting up, etc. as is true with wooden display structures.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Construction system, comprising:
   (a) a main body formed of a light-weight material having a plurality of sides each of which has a recess, and
   (b) a connecting member having hinge line formed by a score on each side and dividing the member into two parts, each part being formed to fit snugly into one of the said recesses in the main body, said member being relatively resistant to bending except along said hinge line, the recess being twice as thick as a single connecting member, the main body and the member being formed from a material consisting of two sheets of paper between which is sandwiched a layer of foamed plastic.

2. Construction system as recited in claim 1, wherein the main body is square and consists of two spaced, parallel sheets between which is sandwiched a cruciform intermediate element defining the said recesses.

3. Construction system as recited in claim 2, wherein the cruciform intermediate element having the size and shape derived from a square sheet from the sides of which are removed 45° triangular portions, the base of each triangle lying along the side of the square sheet, but stopping short of the corners of the sheet by a substantial distance.

4. Construction system as recited in claim 3, wherein two main bodies can be joined in line by using two connecting members with the hinges extending between the bodies at a right angle to the joined sides, wherein two main bodies can by joined at an angle by using two connecting members with their hinges lying parallel and between the joined sides, wherein three main bodies can be joined with two in the same plane and one at a right angle to that plane by using three connecting members, wherein the three main bodies can be joined at 120° to each other by using three connecting members, wherein four main bodies can be joined at 90° to each other by using four connecting members, and wherein five main bodies can be joined to form an open-sided cube by using either connecting members and sixteen fillers.

5. Construction system as recited in claim 2, wherein each of the sheets consists of two sheets of paper between which is sandwiched a layer of resilient foamed plastic.

6. Construction system as recited in claim 1, wherein a support element is provided having two triangles joined by an intermediate portion, each triangle being capable of fitting snugly into one of the said recesses, the intermediate portion having hinge lines to permit it to be folded into a box-like configuration of triangular cross-sections.

* * * * *